United States Patent [19]

Bauer

[11] Patent Number: 5,531,479
[45] Date of Patent: Jul. 2, 1996

[54] VEHICLE SEAT BELT RESTRAINT SYSTEM

[75] Inventor: Barney J. Bauer, Fenton, Mich.

[73] Assignee: TRW Vehicle Safety Systems Inc., Lyndhurst, Ohio

[21] Appl. No.: 375,646

[22] Filed: Jan. 20, 1995

[51] Int. Cl.$^6$ ................................................. B60R 22/36
[52] U.S. Cl. .......................... 280/806; 280/805; 297/480; 297/472
[58] Field of Search ..................................... 280/806, 805, 280/801.1, 808; 188/375; 297/480, 472, 470

[56] References Cited

U.S. PATENT DOCUMENTS

| | | | |
|---|---|---|---|
| 4,237,690 | 12/1980 | Tsuge et al. | 280/805 X |
| 4,273,361 | 6/1981 | Takei et al. | 280/805 |
| 4,615,540 | 10/1986 | Sedlmayr et al. | 280/806 |
| 5,234,181 | 8/1993 | Schroth | 244/122 B |
| 5,295,714 | 3/1994 | Fohl | 280/806 |
| 5,340,152 | 8/1994 | Föhl | 280/805 |
| 5,344,096 | 9/1994 | Frei et al. | 280/805 X |
| 5,350,194 | 9/1994 | Föhl | 280/806 X |
| 5,423,598 | 6/1995 | Laiu, Jr. et al. | 297/480 X |
| 5,431,447 | 7/1995 | Bauer | 280/805 |

*Primary Examiner*—Christopher P. Ellis
*Attorney, Agent, or Firm*—Tarolli, Sundheim, Covell, Tummino & Szabo

[57] ABSTRACT

An apparatus (10) comprises seat belt webbing (26), which is extensible about a vehicle occupant, and an actuatable pretensioner (50). The pretensioner (50) includes a web clamp mechanism (100, 130, 132). When the pretensioner (50) is actuated, the web clamp mechanism (100, 130, 132) clamps against the seat belt webbing (26) and moves to an actuated position to tension the seat belt webbing against the vehicle occupant. An energy absorbing mechanism (90) dissipates energy transferred to the seat belt webbing (26) by the vehicle occupant after the web clamp mechanism (100, 130, 132) moves to the actuated position. The energy absorbing mechanism (90) comprises a member (92) and a cutter (75) for cutting the member. A wedge block assembly (108) connects the web clamp mechanism (100, 130, 132) to the member (92) after the web clamp mechanism has moved to the actuated position. The web clamp mechanism (100, 130, 132) and the member (92) thereafter move together when a predetermined force is applied to the seat belt webbing (26) by the vehicle occupant. The cutter (75) is supported in a position to cut the member (92) as the member moves with the web clamp mechanism (100, 130, 132).

23 Claims, 5 Drawing Sheets

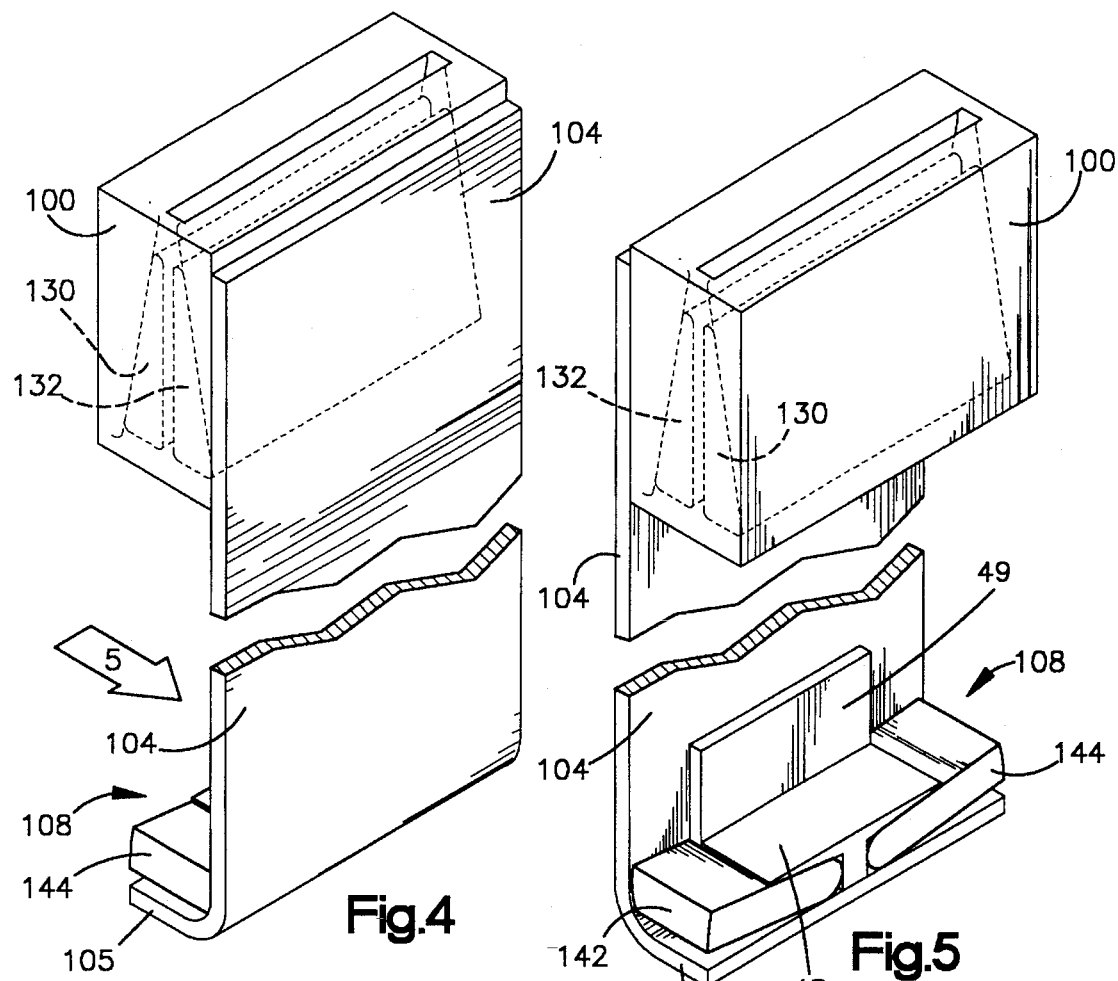
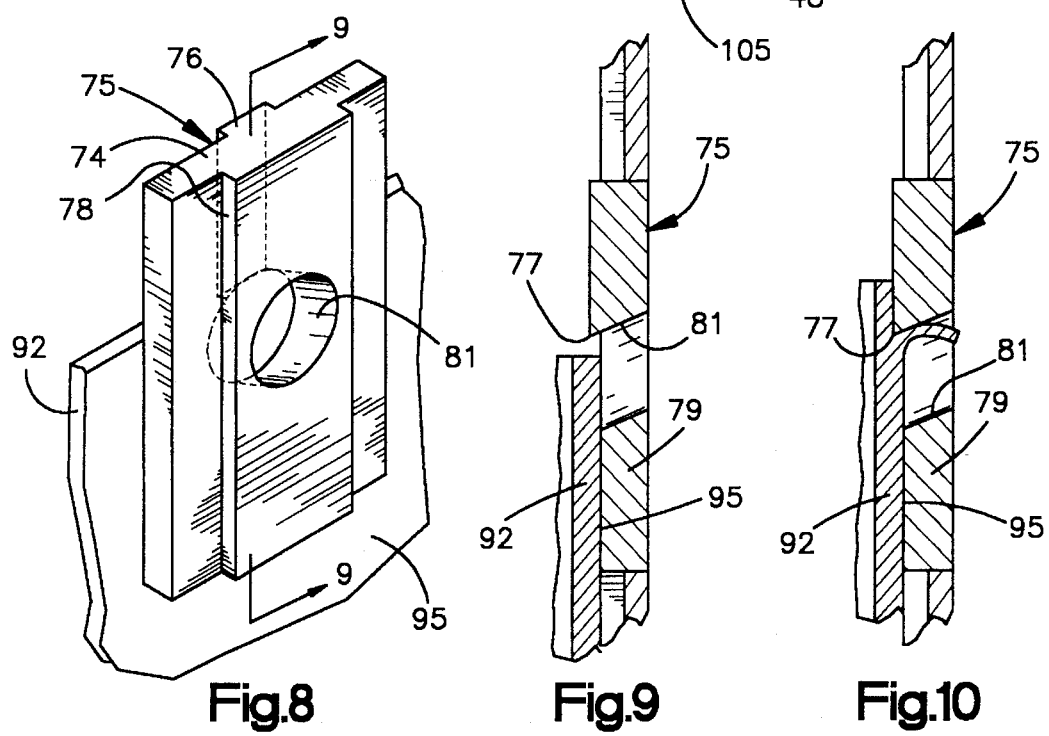

VEHICLE SEAT BELT RESTRAINT SYSTEM

BACKGROUND OF THE INVENTION

1. Technical Field

The present invention relates to a vehicle occupant seat belt restraint system, and is particularly directed to a vehicle occupant seat belt restraint system having a seat belt pretensioner.

2. Background Art

Many different vehicle occupant seat belt restraint systems are known. Some systems include an actuatable pretensioner which, when actuated, draws the seat belt against a vehicle occupant. A typical vehicle occupant seat belt restraint system includes lap and shoulder belt portions which extend around an occupant seated in a vehicle seat. When the vehicle experiences deceleration, such as occurs in a frontal collision, the occupant continues to move in the forwards direction of travel of the vehicle and presses against the lap and shoulder belt portions.

In a system which includes a pretensioner, a crash sensor is used to determine if the crash is above a predetermined threshold. If so, the pretensioner actuates, and the occupant presses against the seat belt earlier in the crash event than is the case without a pretensioner. As the occupant presses against the seat belt, energy is transferred to the seat belt. The energy is ultimately dissipated in the form of work done. Since the occupant presses against the seat belt earlier in the crash event, the dissipation of energy occurs over a longer time period, and the pretensioner therefore tends to lower the peak loads imparted to the occupant in a given crash. In high energy crash situations, even with the use of a pretensioner, the seat belt may cause excessive loads to be imparted to the occupant. Thus, after the pretensioner has deployed, it can be desirable to (i) allow the occupant to move as the occupant presses against the seat belt and (ii) dissipate energy transferred into the seat belt as a function of the occupant's movement by limiting the peak load.

SUMMARY OF THE INVENTION

In accordance with one aspect of the present invention, an apparatus comprises seat belt webbing which is extensible about a vehicle occupant. The apparatus further comprises actuatable pretensioner means for, when actuated, tensioning seat belt webbing against the vehicle occupant. The pretensioner means includes a web clamp mechanism for, when the pretensioner means is actuated, clamping against the seat belt webbing and moving to an actuated position to tension the seat belt webbing against the vehicle occupant.

An energy absorbing mechanism dissipates energy transferred to the seat belt webbing by the vehicle occupant after the web clamp mechanism moves to the actuated position. The energy absorbing mechanism comprises a member and a cutter for cutting the member. The pretensioner means includes means for connecting the web clamp mechanism to the member after the web clamp mechanism has moved to the actuated position to cause the web clamp mechanism and the member to move together when a sufficient force is applied to the seat belt webbing by the vehicle occupant. The cutter is supported in a position to cut the member as the member moves with the web clamp mechanism.

In accordance with another aspect of the present invention, an apparatus comprises vehicle seat belt webbing which is extensible about a vehicle occupant. The apparatus further comprises actuatable seat belt webbing pretensioner means for, when actuated, tensioning the seat belt webbing against the vehicle occupant. The pretensioner means includes a first member movable to an actuated position to tension the seat belt webbing against the vehicle occupant when the pretensioner means is actuated. An energy absorbing mechanism dissipates energy transferred to the seat belt webbing by the vehicle occupant after the first member moves to the actuated position. The energy absorbing mechanism comprises a second member having a planar surface and a cutter for cutting into the planar surface. The pretensioner means includes means for connecting the first member to the second member after the first member has moved to the actuated position to cause the first member and the second member to move together when a predetermined force is applied to the seat belt webbing by the vehicle occupant. The cutter is supported in a fixed position relative to the second member to cut the planar surface of the second member as the second member moves.

In accordance with another aspect of the present invention, an apparatus comprises vehicle seat belt webbing which is extensible about a vehicle occupant. A member is connectable with the seat belt webbing and movable in a given direction in response to movement of a vehicle occupant against the seat belt webbing. First means is provided for blocking movement of the member in the given direction. Second means is provided for cutting the member as the member moves in the given direction. Sensing means senses a characteristic such as an occupant characteristic and/or a vehicle collision characteristic. Control means responsive to the sensing means selectively deactivates the first means to allow the member to move and to be cut by the second means as the member moves in the given direction. For example, the control means may deactuate the first means if the occupant is relatively light in weight and the crash is of low severity.

In accordance with still another aspect of the present invention, an apparatus comprises vehicle seat belt webbing which is extensible about a vehicle occupant. Actuatable seat belt webbing pretensioner means is provided for, when actuated, tensioning the seat belt webbing against the vehicle occupant. First and second energy absorbing mechanisms dissipate energy transferred to the seat belt webbing in response to movement of the vehicle occupant against the seat belt webbing after the pretensioner means is actuated. Sensing means senses a characteristic such as an occupant characteristic and/or a vehicle collision characteristic. Control means responsive to the sensing means is provided for selectively enabling operation of one or both of the first and second energy absorbing mechanisms.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a view of parts of the device shown in FIG. 3;

FIG. 5 is a view looking in the direction of arrow 5 in FIG. 4;

FIG. 8 is a perspective view of a part of the device of FIG. 3;

FIG. 9 is a sectional view taken approximately along line 9—9 of FIG. 8;

FIG. 10 is a view similar to FIG. 9 but showing parts in a different position;

DESCRIPTION OF PREFERRED EMBODIMENTS

Figure 1:
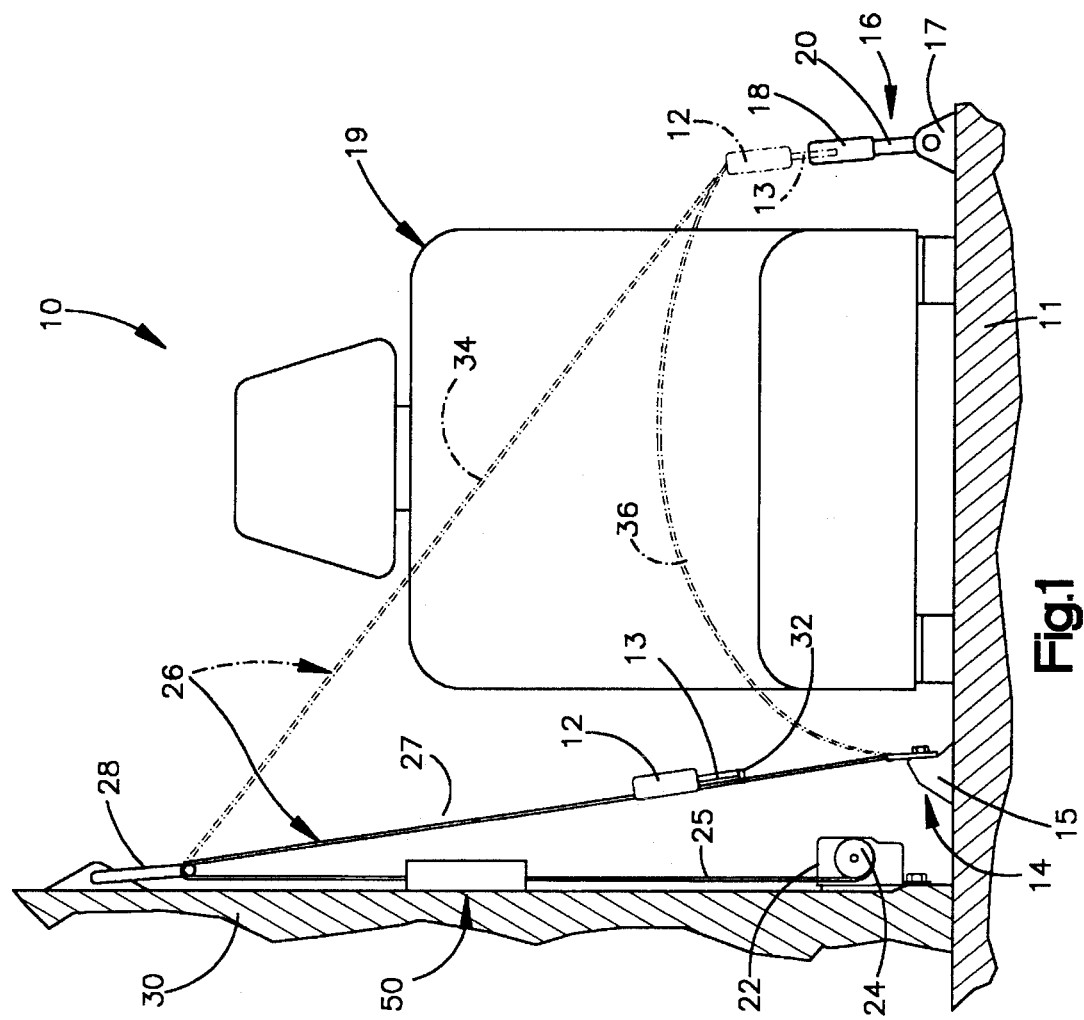
FIG. 1 is a schematic view of a vehicle seat belt restraint system embodying the present invention.

A three-point vehicle occupant seat belt restraint system 10 embodying the present invention is illustrated in FIG. 1. The seat belt restraint system 10 includes a seat belt retractor 22 which is connected to a vehicle 11. The seat belt retractor 22 includes a spool 24 with seat belt webbing 26 wound around the spool 24. A spring (not shown) biases the spool in a belt winding direction to wind the seat belt webbing 26 onto the spool 24. The seat belt webbing 26 is unwound from the spool 24 when forces sufficient to overcome the biasing force of the spring are applied to the seat belt webbing 26. The seat belt retractor 22 further includes an actuatable locking pawl mechanism (also not shown) which, when actuated, locks the spool 24 and prevents payout of the seat belt webbing from the spool 24 in the belt unwinding direction. The locking pawl mechanism is actuated when the seat belt retractor 22 is subjected to deceleration above a predetermined threshold, such as occurs in a vehicle collision. The structure and operation of such a locking pawl mechanism are conventional and, therefore, will not be described herein.

The seat belt restraint system 10 also includes an outboard anchorage 14 located on the same side of a vehicle seat 19 as the seat belt retractor 22 and an inboard anchorage 16 on the opposite side of the vehicle seat 19. The inboard anchorage 16 includes a buckle 18 connected to the vehicle 11 by a suitable buckle connection 20. The buckle connection 20 is connected to a bracket 17 which, in turn, is fixed to the vehicle 11.

The seat belt webbing 26 extends up from the seat belt retractor 22 to a D-ring 28 which is mounted to the B pillar 30 of the vehicle 11. The seat belt webbing 26 extends through an opening of the D-ring 28 and then down to the outboard anchorage 14 where the end of the seat belt webbing 26 is connected to a bracket 15 which, in turn is fixed to the vehicle 11.

A tongue assembly 12 includes a tongue portion 13 and is mounted on the seat belt webbing 26. The tongue assembly 12 is free to slide along the length of the seat belt webbing 26. A stop 32 is connected to the seat belt webbing 26 to block the tongue assembly 12 from sliding down the seat belt webbing 26 to the bracket 15.

The seat belt webbing 26 and the tongue assembly 12 are movable between a retracted position shown in solid lines in FIG. 1 and an extended position shown in broken lines in FIG. 1. When in the retracted position, the seat belt webbing 26 has portions 25, 27 (shown in solid lines in FIG. 1) which extend vertically along the B-pillar 30 of the vehicle. The seat belt webbing 26 is moved to its extended position by a vehicle occupant seated on the vehicle seat 19 manually gripping the tongue assembly 12 and inserting the tongue portion 13 into the buckle 18. This results in seat belt webbing 26 being drawn from the spool 24. When in the extended position, a portion 34 (shown in broken lines in FIG. 1) of the seat belt webbing 26 extends across the torso of the occupant and another portion 36 (also shown in broken lines in FIG. 1) of the seat belt webbing 26 extends across the lap of the occupant.

Figure 2:
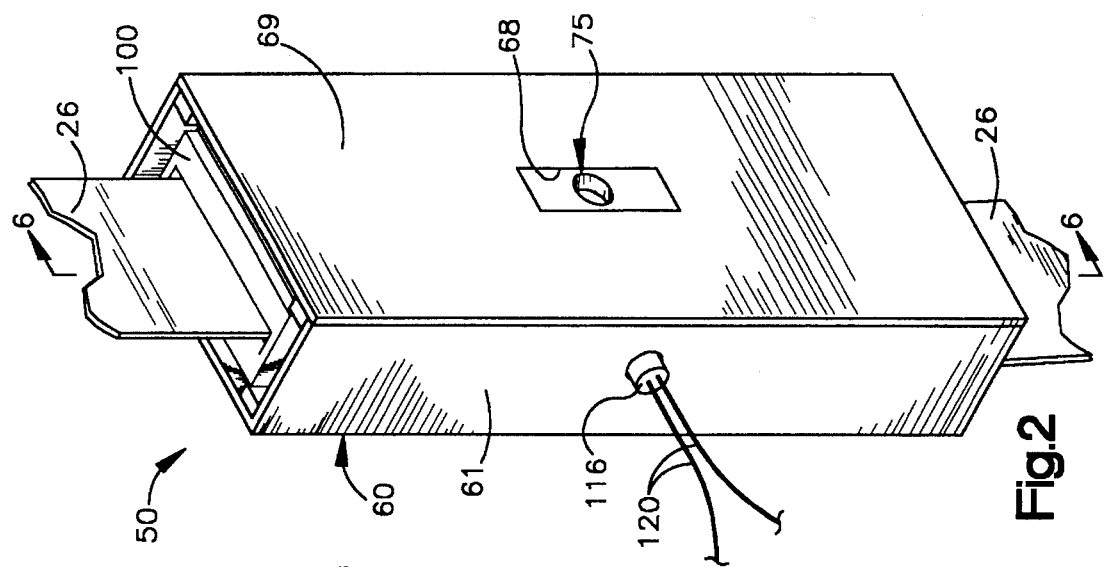
FIG. 2 is an enlarged perspective view of a device shown in FIG. 1.
Figure 3:
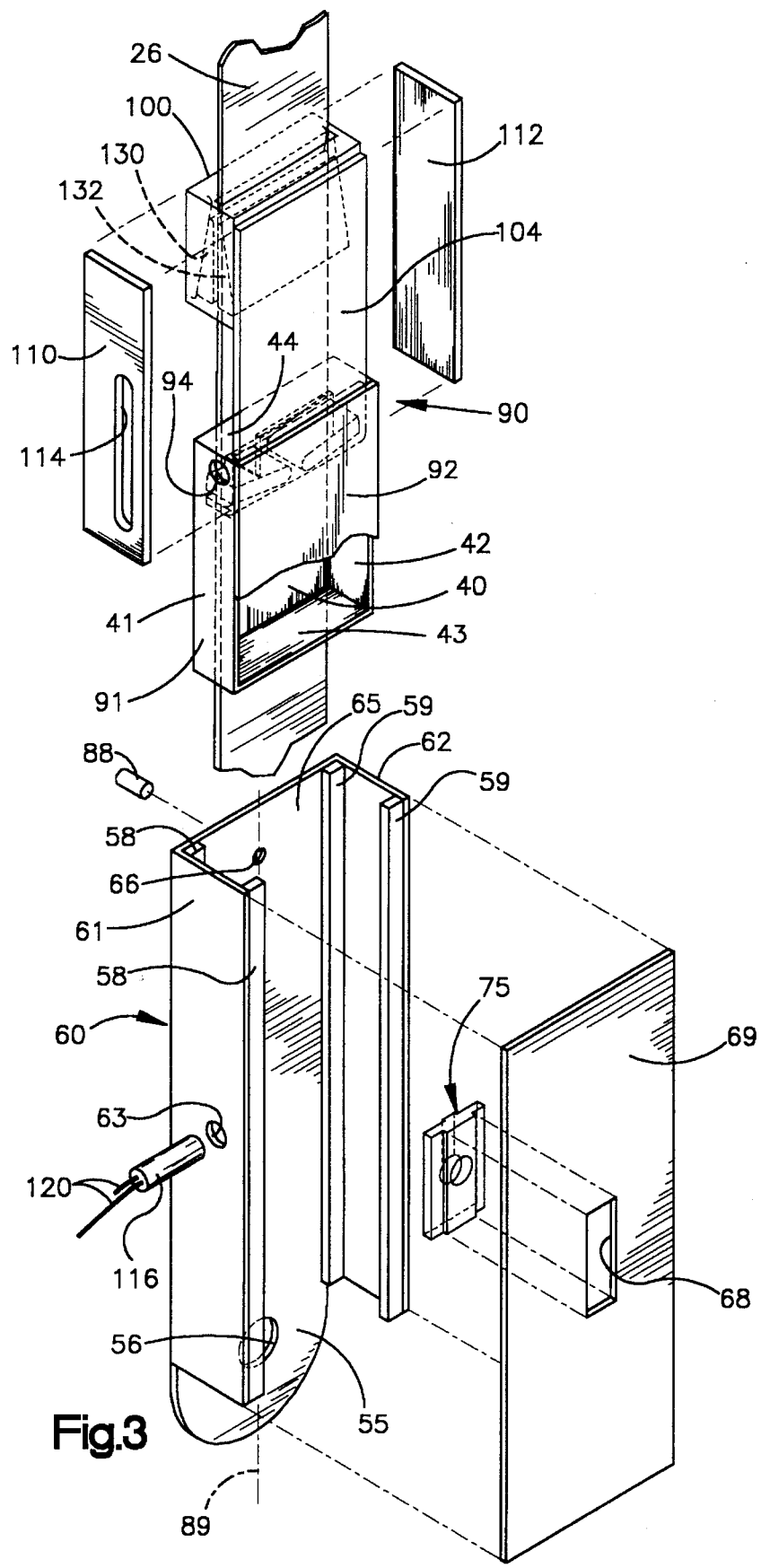
FIG. 3 is an exploded view of the device of FIG. 2.

Preferably, a seat belt pretensioner 50 is secured to the B-pillar 30 at a location between the seat belt retractor 22 and the D-ring 28. Alternatively, the pretensioner 50 may be connected to the seat belt retractor 22. Referring to FIGS. 2 and 3, the pretensioner 50 comprises a housing member 60 having a flat base portion 65 and upstanding side wall portions 61, 62. The base portion 65 has a hole 66 which receives a shear pin 88. The side wall portion 61 has a hole 63. The housing member 60 has a length and a longitudinal axis 89 which extends along the length of the housing member 60. A plate-like flange 55 having an opening 56 is located at one end of the housing member 60. The pretensioner 50 is secured to the B-pillar 30 by a suitable fastener which extends through the opening 56 in the flange 55.

A pair of slide rails 58 is attached to the side wall portion 61 and another pair of slide rails 59 is attached to the side wall portion 62. The slide rails 58, 59 may be attached to the side wall portions 61, 62 by using a suitable adhesive, for example. A removable cover member 69 engages and is secured to the side wall portions 61, 62 by suitable fasteners (not shown) so that the cover member 69 is spaced from the base portion 65 of the housing member 60. The cover member 69 has a rectangular opening 68.

Figure 6:
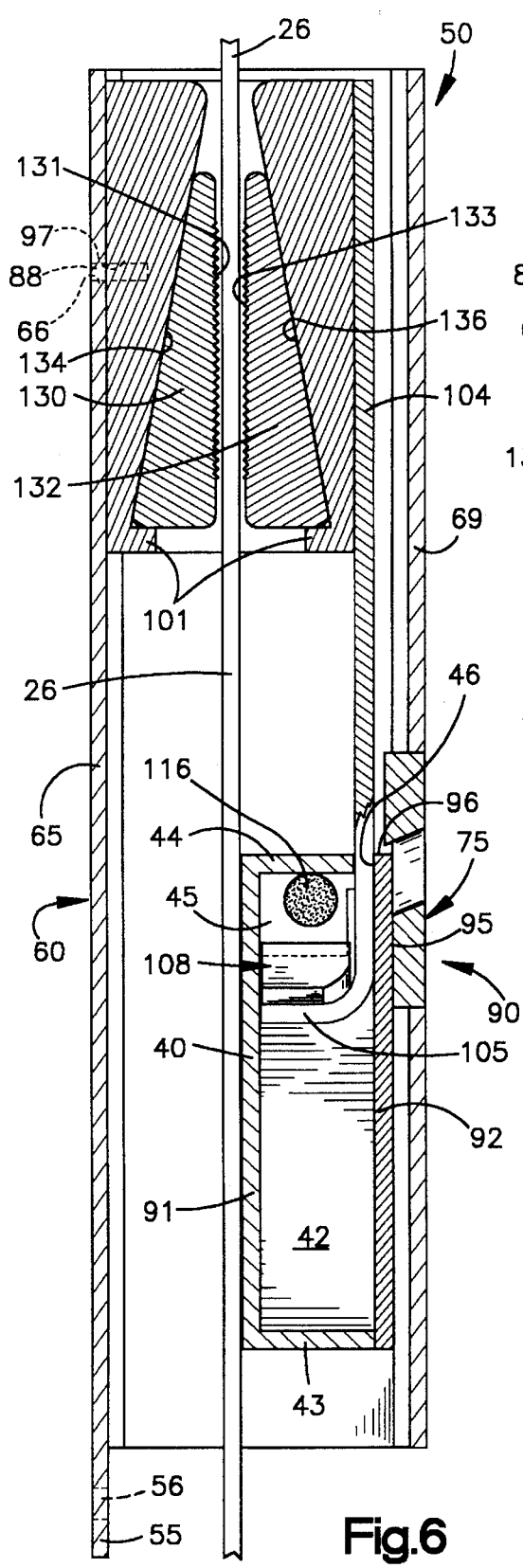
FIG. 6 is a sectional view taken approximately along line 6—6 of FIG. 2.

As best illustrated in FIG. 3 and 6, the pretensioner 50 further comprises a web clamp housing 100. The web clamp housing 100 includes a bottom plate 101 and inner wall surfaces 134, 136 extending away from the bottom plate 101. The web clamp housing 100 also has a hole 97 which receives the shear pin 88. The shear pin 88 supports the web clamp housing 100 and locates it at an initial position shown in FIG. 6.

A pair of web clamp members 130, 132 is disposed in the web clamp housing 100. The web clamp members 130, 132 are supported on the bottom plate 101 of the web clamp housing 100, as best illustrated in FIG. 6. Springs (not shown), in the form of foam blocks or the like, urge the web clamp members 130, 132 upward (as viewed in FIG. 6). The web clamp member 130 has an engagement face 131. The web clamp member 132 has an engagement face 133 which faces toward the engagement face 131 of the web clamp member 133. Initially, seat belt webbing 26 runs freely between the engagement faces 131, 133 of the web clamp members 130, 132.

Referring to FIGS. 3 and 6, the pretensioner 50 further comprises a case 91 including a base portion 40 and a pair of side wall portions 41, 42 projecting away from the base portion 40. The case 92 also includes a bottom side portion 43 projecting away from the base portion 40 and extending between the side wall portions 41, 42 at one end of the side wall portions 41, 42. A top side portion 44 projects away from the base portion 40 and extends between the side wall portions 41, 42 at the other end of the side wall portions 41, 42. The side wall portion 41 has a hole 94 (FIG. 3) in the vicinity of the top side portion 44. The hole 94 aligns with the hole 63 in the side wall portion 61 of the housing member 60.

The case 91 further includes a cover 92 which is fastened to the side wall portions 41, 42 and the bottom side portion 43 using suitable screws (not shown). The base portion 40, the side wall portions 41, 42, the top and bottom side portions 43, 44, and the cover 92 define a chamber 45 (FIG. 6). An opening 46 is defined between the top side portion 44 and the cover 92 and communicates with the chamber 45. The cover 92 has an edge engagement surface 96 adjacent the opening 46 and a planar outer surface 95 adjacent the edge engagement surface 96, as best shown in FIG. 6. The edge engagement surface 96 projects perpendicular to the planar outer surface 95.

One end of a piston 104 is attached to the web clamp housing 100, as best illustrated in FIG. 4. The piston 104 is a generally flat, rectangular sheet of metal. The other end of the piston 104 extends through the opening 46 into the chamber 45 of the case 91. The end of the piston 104 which extends into the chamber 45 has a flange portion 105 which projects perpendicular to the remainder of the piston and to the planar surface 95 of the cover 92 of the case 91.

A wedge block assembly 108 (best illustrated in FIG. 5) is disposed at the end of the piston 104 located in the chamber 45 of the case 91. The wedge block assembly 108 includes a pair of pivotable wedge members 142, 144 which, when pivoted, engage the side wall portions 41, 42 of the case 91 and wedge against the side wall portions 41, 42. An L-shaped bracket 49 (FIG. 5) is attached to the piston 104. The bracket 49 has a portion 48 which overlies the wedge members 142, 144 and holds the wedge members 142, 144 adjacent the flange portion 105 of the piston 104 in the chamber 45. However, the wedge members 142, 144 can pivot relative to the bracket 49.

Clamp guides 110, 112 (FIG. 3) are attached, such as by welding or other suitable means, to opposite sides of the web clamp housing 100. The clamp guides 110, 112 fit between and are slidable along the slide rails 58, 59, respectively, on the side wall portions 61, 62. The clamp guides 110, 112 are thus slidable in a direction parallel to the longitudinal axis 89 relative to the housing member 60. The clamp guide 110 has a longitudinal slot 114 which aligns with the hole 94 in the side wall portion 41 of the case 91 which, in turn, aligns with the hole 63 in the side wall portion 61 of the housing member 60.

An actuatable pyrotechnic device 116 projects through the hole 63 in the side wall portion 61, the slot 114 in the clamp guide 110, and the hole 94 in the case 91, and is securely supported in a suitable manner. The pyrotechnic device 116 extends into the chamber 45 and is located between the top side portion 44 of the case 91 and the wedge block assembly 108. The pyrotechnic device 116 has two electrical conductors 120 and is actuated when an electrical actuating signal is applied to the electrical conductors 120. Typically, an actuating signal is applied to the electrical conductor 120 when a deceleration sensor (not shown) senses vehicle deceleration above a predetermined threshold, such as occurs in a vehicle collision.

Referring to FIGS. 3, 8, and 9, the pretensioner 50 further comprises an energy absorbing device 90. The energy absorbing device 90 includes a generally rectangular cutter block 75 which is fixedly supported in the rectangular opening 68 in the cover member 69. The cutter block 75 is thus fixed in position relative to the planar outer surface 95 of the cover 92.

The cutter block 75 includes a base portion 74 located between a connecting portion 78 and a cutting tab portion 76. The connecting portion 78 is inserted into the rectangular opening 68 in the cover member 69. The cutter block 75 may be fixedly supported in the rectangular opening 68 in the cover member 69 using suitable fasteners, such as screws (not shown), which are screwed through the material of the cover member 69 and the material of the base portion 74 of the cutter block 75. The connecting portion 78 is closely fitted in the opening 68 in the cover member 69.

The cutting tab portion 76 includes a cutting edge 77 (FIG. 9) for cutting the material of the cover 92. The base portion 74 includes a projecting portion 79 located directly beneath the cutting edge 77 as shown in FIG. 9. The projecting portion 79 lies in a plane perpendicular to the surface 95 which plane also contains the cutting edge 77. The projecting portion 79 lies over the planar outer surface 95 of the cover 92 and engages the planar outer surface 95 of the cover 92 when the cutting edge 77 cuts the material of the cover 92. The cutter block 75 has a hole 81 which extends through the connecting portion 78, the base portion 74, and the cutting tab portion 76. The hole 81 is located centrally of the cutter block 75 and in the vicinity between the cutting edge 77 and the projecting portion 79.

Figure 7:
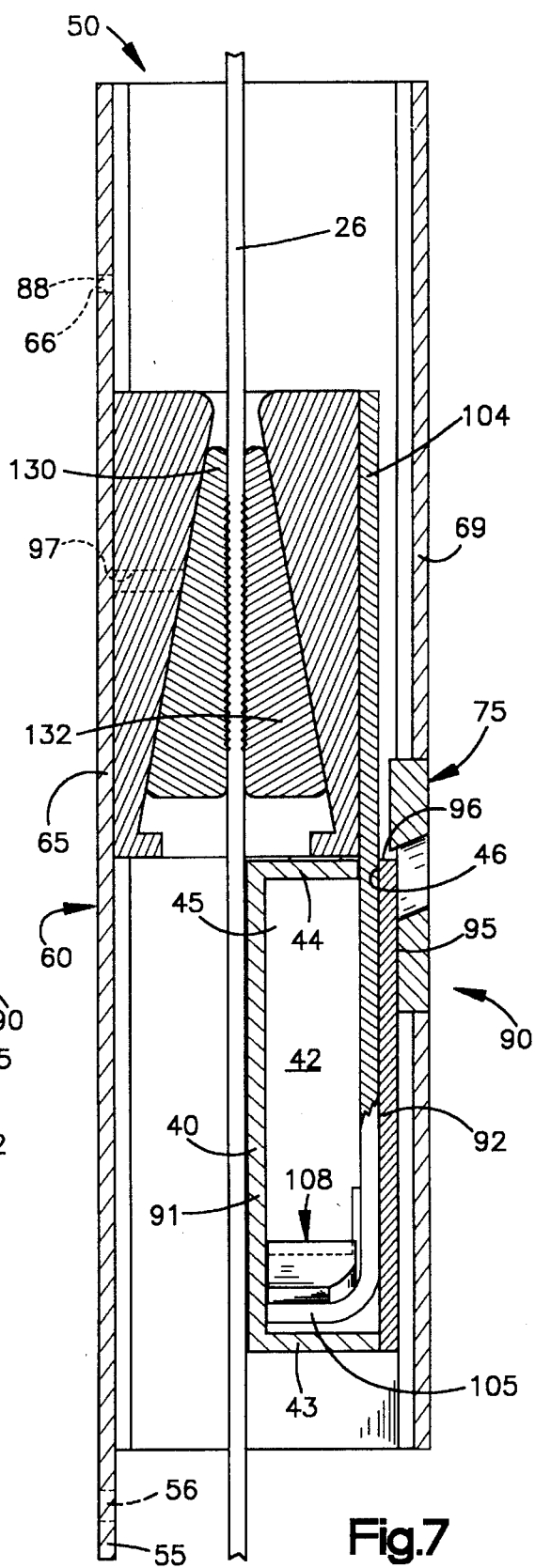
FIG. 7 is a view similar to FIG. 6 but showing parts in a different position.
Figure 11:
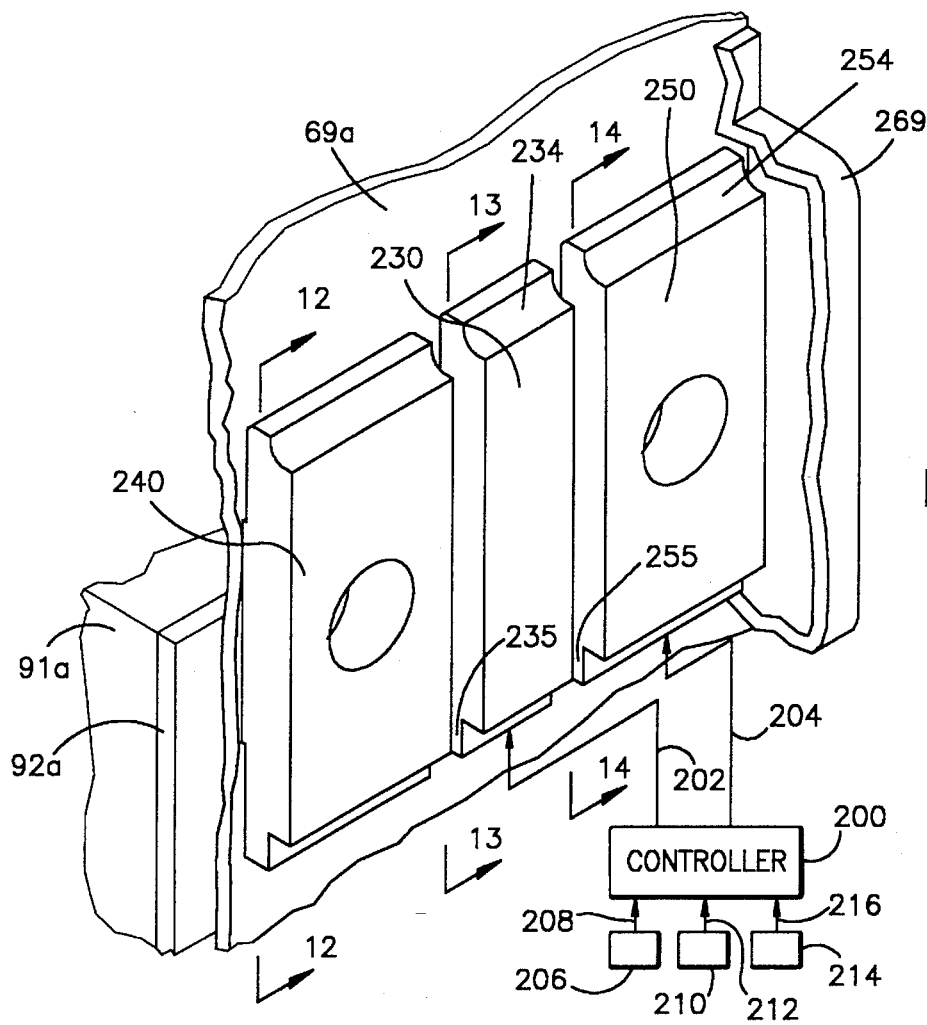
FIG. 11 is a view showing a second embodiment of the present invention.

When vehicle deceleration above a predetermined threshold occurs, such as occurs in a vehicle collision, the seat belt retractor 22 locks the spool 24 to prevent payout of the seat belt webbing 26. At or about the same time, the pyrotechnic device 116 actuates. When actuated, the pyrotechnic device 116 releases gas into the chamber 45. The pressure of the gas in the chamber 45 acts on the piston 104 and is sufficient to cause the shear pin 88 to break. Thus, the web clamp housing 100 slides abruptly downward on the guide rails 58, 59 from the position shown in FIG. 6 to the position shown in FIG. 7.

As the web clamp housing 100 slides abruptly downward, the web clamp members 130, 132 slide upward (as viewed in FIG. 6) relative to the inner wall surfaces 134, 136 of the web clamp housing 100. This relative movement causes the web clamp members 130, 132 to wedge against the inner wall surfaces 134, 136 and the engagement faces 131, 133 of the web clamp members 130, 132 to move toward each other to clamp the seat belt webbing 26. Thus, the seat belt webbing 26 is pulled downward together with the web clamp housing 100 and the web clamp members 130, 132 by the piston 104 to tension the seat belt webbing 26 against the occupant.

After the web clamp housing 100 and the seat belt webbing 26 move in the downward direction in response to actuation of the pyrotechnic device 116, the vehicle occupant will still tend to move forward relative to the vehicle 11. As the vehicle occupant moves forward and presses against the seat belt webbing 26, tension forces are created in the seat belt webbing 26. The tension forces are applied to the seat belt webbing 26 in a direction which causes the web clamp housing 100 to slide back in the upward direction because the web clamp members 130, 132 continue to clamp against the seat belt webbing 26 and are wedged against the web clamp housing 100.

As the web clamp housing 100 moves back in the upward direction, the wedge members 142, 144 of the wedge block assembly 108 pivot and wedge against the side wall portions 41, 42 of the case 91. The wedging action of the wedge members 142, 144 resists movement of the wedge block assembly 108 and thus the web clamp housing 100 in the upward direction relative to the case 91. The case 91 moves upward until the edge engagement surface 96 of the cover 92 engages the cutting edge 77 of the cutting tab portion 76. The case 91 could be located, however, such that the edge engagement surface 96 is in engagement with the cutting edge 77, and there is no movement of the case 91 required to engage the cover 92 with the cutting edge 77.

As the case 91 and the cover 92 of the case 91 move upward against the cutting edge 77, the cutting edge 77 cuts the material of the cover 92 and cuts a groove into the planar outer surface 95 of the cover 92 as shown in FIG. 10. As the cutting edge 77 cuts the material of the cover 92, the projecting portion 79 of the cutter block 75 engages the planar outer surface 95 of the cover 92 to minimize the possibility of the cutting edge 77 cutting into the planar outer surface 95 at an angle to the planar outer surface 95. This feature produces a constant cut depth. The cut material from the cover 92 passes through the hole 81 in the cutter block 75.

Since the connecting portion 78 of the cutter block 75 is closely fitted in the opening 68 in the cover member 69, the cover member 69 resists movement of the cutter block 75. By using the cover member 69 to resist movement of the cutter block 75 due to the cutting edge 77 cutting the material of the cover 92, only a small load, if any, is transmitted to any fastener which secures the cutter block 75 to the cover member 69.

From the above description, it should be apparent to one skilled in the art that the kinetic energy of the occupant moving into the seat belt webbing 26 is dissipated as work. Work is the result of a force acting through a distance. The resisting force is the cutting force of the cutting edge 77 cutting into the material of the cover 92. This resisting force acts through a distance (cutting stroke) which is the distance of movement of the cover 92. Thus, some of the kinetic energy of the vehicle occupant is transmitted through the seat belt webbing 26 and is dissipated by the work performed by the cutting edge 77 cutting into the material of the cover 92 as the cover moves. The amount of the cutting force depends upon the depth of the material removed from the cover 92, the specific material of the cover 92, the thickness of the cover 92, and the particular shape of the cutting edge 77 of the cutter block 75.

A second embodiment of the present invention is illustrated in FIGS. 11–14. Since the embodiment of the invention illustrated in FIGS. 11–14 is generally similar to the embodiment illustrated in FIGS. 1–10, similar numerals are utilized to designate similar components, the suffix letter "a" being added to the numerals when referring to the embodiment of FIGS. 11–14 to avoid confusion.

Referring to FIGS. 11–14, a blocking member 230, a first cutting member 240, and a second cutting member 250 are supported on the cover member 69a. A housing member 269 is secured to the cover member 69a by suitable fasteners, such as rivets 270. The housing member 269 has a chamber in which the blocking member 230 and the first and second cutting members 240, 250 are located. A curved embossment 260 is disposed on one side of the housing member 269. A flexible stop 275 projects into the interior of the housing member 269 at an opposite side of the housing member 269.

Figures 12, 13, 14:
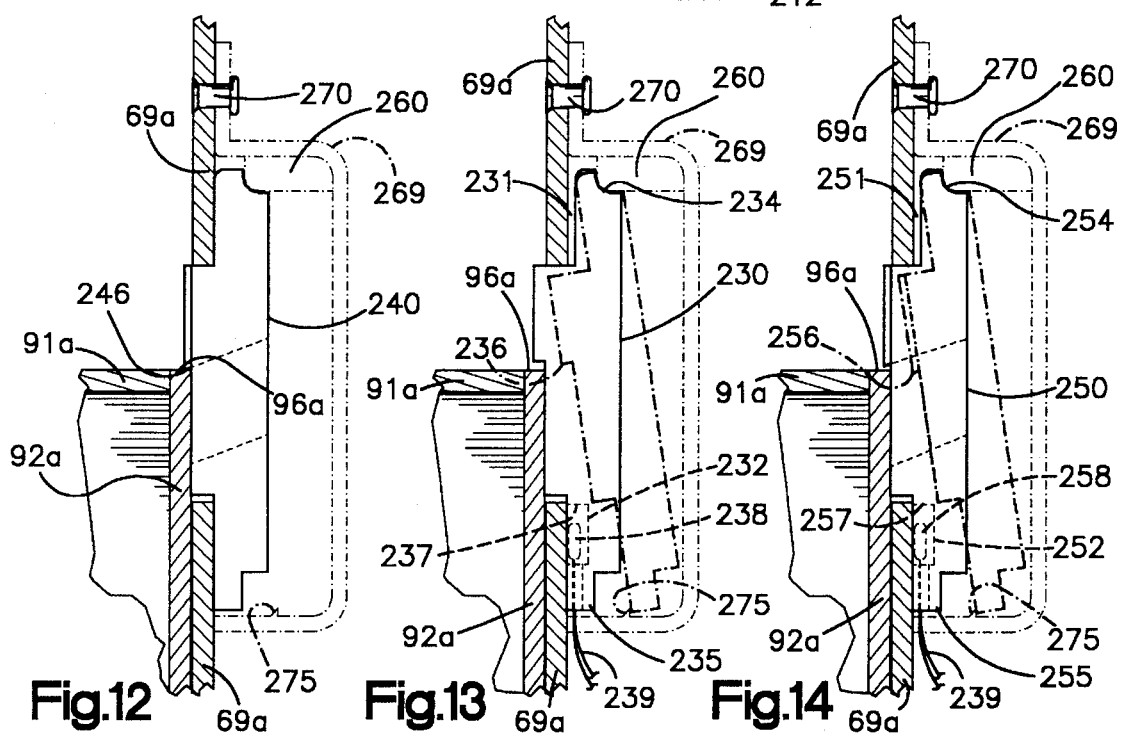
FIG. 12 is a sectional view taken approximately along line 12—12 of FIG. 11.
FIG. 13 is a sectional view taken approximately along line 13—13 of FIG. 11.
FIG. 14 is a sectional view taken approximately along line 14—14 of FIG. 11.

The first cutting member 240 has a fixed cutting position relative to the cover member 69a, as shown in solid lines in FIG. 12. The first cutting member 240 has a cutting edge 246 which engages the engagement surface 96a and cuts into the material of the cover 92a of the case 91a in the same way that the cutting edge 77 in the embodiment of FIGS. 1–10 cuts the material of the cover 92 of the case 91a.

The second cutting member 250 has an initial cutting position (shown in solid lines in FIG. 14) and a deactivated position (shown in dashed lines in FIG. 14). The second cutting member 250 has an end engagement portion 255 at one end and a curved surface 254 at an opposite end. The curved surface 254 abuts the curved embossment 260 of the housing member 269. A small gap 251 is provided between the cover member 69a and the second cutting member 250 in the vicinity of the curved surface 254 of the second cutting member 250 when the second cutting member 250 is in its initial cutting position. This gap 251 allows the second cutting member 250 to pivot about the area of contact between the curved surface 254 and the curved embossment 260 from its initial cutting position to its deactivated position.

The second cutting member 250 has interior surfaces 257 which define a chamber 252. A microdet 258 is securely mounted to the cover member 69a and is positioned relative to the second cutting member 250 such that the microdet 258 is located in the chamber 252 when the second cutting member 250 is in its initial cutting position. The microdet 258 is a detonable device as is known, and detonates when a detonating signal is applied on electrical conductors 259.

When the microdet 258 detonates, the pressure in the chamber 252 increases sufficiently to cause the second cutting member 250 to pivot about the area of contact between the curved surface 254 and the curved embossment 260 from its initial cutting position to its deactivated position. As the second cutting member 250 pivots to its deactivated position, the end engagement portion 255 engages the flexible stop 275 on the housing member 269 and deflects it to allow the second cutting member 250 to pass by the stop 275. After the second cutting member 250 has passed by the stop 275, the stop returns to its original shape and prevents the second cutting member 250 from returning to its initial cutting position.

The second cutting member 250 has a cutting edge 256. The cutting edge 256 of the second cutting member 250 may have the same cutting depth as the cutting edge 246 of the first cutting member 240. When the second cutting member 250 is in its initial cutting position, the cutting edge 256 engages the edge engagement surface 96a and cuts the material of the cover 92a in the same way that the cutting edge 246 of the first cutting member 249 cuts the material of the cover 92a. When the second cutting member 250 is in its deactivated position, the cutting edge 256 cannot cut the material of the cover 92a because the cutting edge 256 is out of the path of movement of the cover 92a in the upward direction.

The blocking member 230 has an initial blocking position (shown in solid lines in FIG. 13) and a deactivated position (shown in dashed lines in FIG. 13). The blocking member has an end engagement portion 235 at one end and a curved surface 234 at an opposite end. The curved surface 234 abuts the curved embossment 260 of the housing member 269. A small gap 231 is provided between the cover member 69a and the blocking member 230 in the vicinity of the curved surface 234 of the blocking member 230 when the blocking member 230 is in its initial blocking position. This gap 231 allows the blocking member 230 to pivot about the area of contact between the curved surface 234 and the curved embossment 260 from its initial blocking position to its deactivated position.

The blocking member 230 has interior surfaces 237 which define a chamber 232. A microdet 238 is securely mounted to the cover member 69a and is positioned relative to the blocking member 230 such that the microdet 238 is located in the chamber 232 when the blocking member 230 is in its initial blocking position. The microdet 238 detonates when a detonating signal is applied on electrical conductors 239.

When the microdet 238 detonates, the pressure in the chamber 232 increases sufficiently to cause the blocking member 230 to pivot about the area of contact between the curved surface 234 and the curved embossment 260 from its initial blocking position to its deactivated position. As the blocking member 230 pivots to its deactivated position, the end engagement portion 235 engages the flexible stop 275 on the housing member 269 and deflects it to allow the blocking member 230 to pass by the stop 275. After the blocking member 230 has passed by the stop 275, the stop returns to its original shape and prevents the blocking member 230 from returning to its initial blocking position.

The blocking member 230 has a blocking surface 236 which is engaged by the edge engagement surface 96*a* of the cover 92*a* when the blocking member 230 is in its initial blocking position and the cover 92*a* moves in the upward direction. When this occurs, the cutting edges 246, 256 of the first and second cutting members 240, 250, respectively, are prevented from cutting the material of the cover 92*a*. When the blocking member 230 is in its deactivated position and the cover 92*a* moves upward, the cutting edge 246 of the first cutting member 240 cuts the material of the cover 92*a*. Also, the cutting edge 256 of the second cutting member 250 cuts the material of the cover 92*a* if the second cutting member 250 is in its initial cutting position.

It should be apparent that some of the kinetic energy of the vehicle occupant transmitted through the seat belt webbing (not shown in FIGS. 11–14) is dissipated by the work performed by only the cutting edge 246 of the first cutting member 240 cutting the material of the cover 92*a* when both the blocking member 230 and the second cutting member 250 are in their deactivated positions. In this case, only one energy absorbing mechanism is provided for dissipating the kinetic energy of the vehicle occupant as work.

It should be apparent also that some of the kinetic energy of the vehicle occupant transmitted through the seat belt webbing is dissipated by the work performed by both the cutting edges 246, 256 of the first and second cutting members 240, 250, respectively, cutting the material of the cover 92*a* when the blocking member 230 is deactivated and the second cutting member 250 is in its initial cutting position. In this second case, two energy absorbing mechanisms (i.e., the first and second cutting members 240, 250) are provided for dissipating the kinetic energy of the vehicle occupant as work.

A controller 200, such as a microcomputer, provides a control signal on a line 202 to control detonation of the microdet 238 located in the chamber 232 of the blocking member 230. The microcomputer 200 also provides a control signal on a line 204 to control detonation of the microdet 258 located in the chamber 252 of the second cutting member 250. A first sensor mechanism 206 includes a sensor which senses a characteristic of an occupant, such as the weight of the occupant in the vehicle, and provides an electrical signal on line 208 indicative of the occupant characteristic. A second sensor mechanism 210 includes a sensor which senses another characteristic of the occupant, such as the location of the occupant in the vehicle, and provides an electrical signal on line 212 indicative of the occupant characteristic.

A third sensor mechanism 214 includes a sensor arrangement which senses a vehicle collision characteristic, such as the crash severity of the vehicle collision, and provides an electrical signal on line 216 indicative of the vehicle collision characteristic. For example, the third sensor mechanism 214 may include a number of sensors located throughout different parts of the vehicle. If a vehicle collision occurs, these sensors cooperate to provide the signal on line 216 indicative of the crash severity of the vehicle collision. Such an arrangement of sensors is disclosed in U.S. Pat. No. 5,216,607, which is assigned to the assignee of the present application.

The microcomputer 200 monitors the electrical signals on lines 208, 212, 216 and generates the control signals on lines 202, 204. The control signals on lines 202, 204 are generated in accordance with a preprogrammed procedure stored in an internal memory of the microcomputer 200. Microcomputers are readily available in the commercial market. Their internal structure and operation are well known in the art and, therefore, the microcomputer 200 will not be described herein.

Each of the control signals on lines 202, 204, which control detonation of the microdets 238, 258, varies as a function of at least one of the electrical signals on lines 208, 212, 216 from the first, second, and third sensor mechanisms 206, 210, 214, respectively. The number of cutting edges cutting the material of the cover 92*a* varies, therefore, as a function of at least one of the electrical signals on lines 208, 212, 216. Thus, the amount of force exerted by the action of cutting members cutting the material of the cover 92*a* varies as a function of the weight and/or location of the vehicle occupant and/or the crash severity of the vehicle collision.

An advantage resulting from using the cutter arrangement shown in FIGS. 11–14 is that the occupant restraint provided to a vehicle occupant can be tailored in accordance with characteristics such as the weight and/or location of a particular vehicle occupant and/or the crash severity of the vehicle collision. For example, if the weight of the vehicle occupant is relatively heavy and the crash is relatively severe, the blocking member 230 would be in its initial blocking position blocking movement of the cover 92*a*. Thus, neither the first nor second cutting members 240, 250 would cut into the material of the cover 92*a* as the occupant tensions the seat belt webbing 26. However, if the weight of the vehicle occupant is relatively light and the crash is relatively severe, the blocking member 230 and the second cutting member 250 would be deactivated, and only the first cutting member 240 would cut into the material of the cover 92*a* as the occupant tensions the seat belt webbing. If the weight of the vehicle occupant is between light and heavy and the crash is relatively severe, only the blocking member 230 may be deactivated, and both the first and second cutting members 240, 250 would cut into the material of the cover 92*a* as the occupant tensions the seat belt webbing 26.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. Apparatus comprising:

seat belt webbing which is extensible about a vehicle occupant;

actuatable pretensioner means for, when actuated, tensioning said seat belt webbing against the vehicle occupant, said pretensioner means including a web clamp mechanism for, when said pretensioner means is actuated, clamping against said seat belt webbing and moving to an actuated position to tension said seat belt webbing against the vehicle occupant;

an energy absorbing mechanism for dissipating energy transferred to said seat belt webbing by the vehicle occupant after said web clamp mechanism moves to said actuated position, said energy absorbing mechanism comprising a member and a cutter for cutting said member;

said pretensioner means including means for connecting said web clamp mechanism to said member after said web clamp mechanism has moved to said actuated position to cause said web clamp mechanism and said member to move together when a predetermined force is applied to said seat belt webbing by the vehicle occupant; and means for supporting said cutter in a position to cut said member as said member moves with said web clamp mechanism due to said predetermined force being applied to said seat belt webbing by the vehicle occupant.

2. Apparatus according to claim 1 wherein said pretensioner means further includes a wall portion to which said member is attached, and said means for connecting said web clamp mechanism to said member includes at least one wedge for wedging against said wall portion to connect said web clamp mechanism and said member together after said web clamp mechanism has moved to said actuated position and said predetermined force is applied to said seat belt webbing by the vehicle occupant.

3. Apparatus according to claim 1 further including a housing for said pretensioner means, said housing comprising said means for supporting said cutter.

4. Apparatus according to claim 1 wherein (i) said member has a planar surface and (ii) said cutter has a cutting edge and a projecting portion which is located relative to said cutting edge such that said projecting portion lies over said planar surface and engages said planar surface when said cutting edge cuts said planar surface to minimize the possibility of said cutting edge cutting said planar surface at an angle to said planar surface.

5. Apparatus according to claim 1 wherein said cutter includes means defining a hole through which cut material of said member passes as said cutter cuts said member.

6. Apparatus according to claim 1 wherein said energy absorbing mechanism further comprises a deactivatable cutter for cutting said member, said cutter, when deactivated, being prevented from cutting said member and thus prevented from dissipating energy transferred to said seat belt webbing.

7. Apparatus according to claim 6 further comprising (i) sensing means for sensing at least one characteristic selected from an occupant characteristic and/or a vehicle collision characteristic and (ii) control means responsive to said sensing means for deactivating said cutter to prevent it from cutting said member as said member moves with said web clamp mechanism in response to said predetermined force being applied to said seat belt webbing by the vehicle occupant.

8. Apparatus according to claim 1 further comprising deactivatable blocking means for blocking movement of said member, said blocking means, when deactivated, allowing said member to be cut by said cutter as said member moves with said web clamp mechanism in response to said predetermined force being applied to said seat belt webbing by the vehicle occupant.

9. Apparatus according to claim 8 further comprising (i) sensing means for sensing at least one characteristic selected from an occupant characteristic and a vehicle collision characteristic and (ii) control means responsive to said sensing means for deactivating said blocking means to allow said member to be cut by said cutter as said member moves with said web clamp mechanism in response to said predetermined force being applied to said seat belt webbing by the vehicle occupant.

10. Apparatus according to claim 1 further comprising (i) a seat belt retractor having a spool around which said seat belt webbing is wound and (ii) a D-ring having an opening through which said seat belt webbing extends, said pretensioner means and said energy absorbing mechanism being located between said seat belt retractor and said D-ring.

11. Apparatus comprising:

seat belt webbing which is extensible about a vehicle occupant;

actuatable pretensioner means for, when actuated, tensioning said seat belt webbing against the vehicle occupant, said pretensioner means including a first member movable to an actuated position to tension said seat belt webbing against the vehicle occupant when said pretensioner means is actuated;

an energy absorbing mechanism for dissipating energy transferred to said seat belt webbing by the vehicle occupant after said first member moves to said actuated position, said energy absorbing mechanism comprising a second member having a planar surface and a cutter for cutting said planar surface;

said pretensioner means including means for connecting said first member to said second member after said first member has moved to said actuated position to cause said first member and said second member to move together when a predetermined force is applied to said seat belt webbing by the vehicle occupant; and means for supporting said cutter in a fixed position relative to said second member to cut said planar surface of said second member as said second member moves.

12. Apparatus according to claim 11 wherein said pretensioner means further comprises a web clamp mechanism connected with said first member, said web clamp mechanism including clamps which clamp against said seat belt webbing and move said seat belt webbing when said pretensioner means is actuated.

13. Apparatus according to claim 11 wherein said pretensioner means further includes a wall portion to which said second member is attached, and said means for connecting said first member to said second member includes at least one wedge disposed on said first member for wedging against said wall portion to connect said first member and said second member together after said first member has moved to said actuated position and said predetermined force is applied to said seat belt webbing by the vehicle occupant.

14. Apparatus according to claim 11 further including a housing for said first and second members, said housing comprising said means for supporting said cutter.

15. Apparatus according to claim 11 wherein said cutter has a cutting edge and a projecting portion which is located relative to said cutting edge such that said projecting portion lies over said planar surface and engages said planar surface when said cutting edge cuts said planar surface to minimize the possibility of said cutting edge cutting said planar surface at an angle to said planar surface.

16. Apparatus according to claim 11 wherein said cutter includes means defining a hole through which cut material of said member passes as said cutter cuts said member.

17. Apparatus according to claim 11 wherein said energy absorbing mechanism further comprises a deactivatable cutter for cutting said planar surface of said second member, said cutter, when deactivated, being prevented from cutting said planar surface of said second member and thus prevented from dissipating energy transferred to said seat belt webbing.

18. Apparatus according to claim 17 further comprising (i) sensing means for sensing at least one characteristic selected from an occupant characteristic and/or a vehicle collision characteristic and (ii) control means responsive to said sensing means for deactivating said cutter to prevent it from cutting said planar surface of said second member as said second member moves in response to said predetermined force being applied to said seat belt webbing by the vehicle occupant.

19. Apparatus according to claim 17 further comprising pyrotechnic actuator means including a detonable microdet for, when detonated, deactivating said deactivatable cutter.

20. Apparatus according to claim 11 further comprising deactivatable blocking means for blocking movement of said second member, said blocking means, when deactivated, allowing said second member to be cut by said cutter as said second member moves with said web clamp mechanism in response to said predetermined force being applied to said seat belt webbing by the vehicle occupant.

21. Apparatus according to claim 20 further comprising (i) sensing means for sensing at least one characteristic selected from an occupant characteristic and a vehicle collision characteristic and (ii) control means responsive to said sensing means for deactivating said blocking means to allow said second member to be cut by said cutter as said second member moves in response to said predetermined force being applied to said seat belt webbing by the vehicle occupant.

22. Apparatus according to claim 20 further comprising pyrotechnic actuator means including a detonable microdet for, when detonated, deactivating said deactivatable blocking means.

23. Apparatus according to claim 11 further comprising (i) a seat belt retractor having a spool around which said seat belt webbing is wound and (ii) a D-ring having an opening through which said seat belt webbing extends, said pretensioner means and said energy absorbing mechanism being located between said seat belt retractor and said D-ring.

\* \* \* \* \*